April 6, 1943.   G. L. TAWNEY ET AL   2,315,672
PRESSURE GAUGE
Filed Dec. 4, 1940
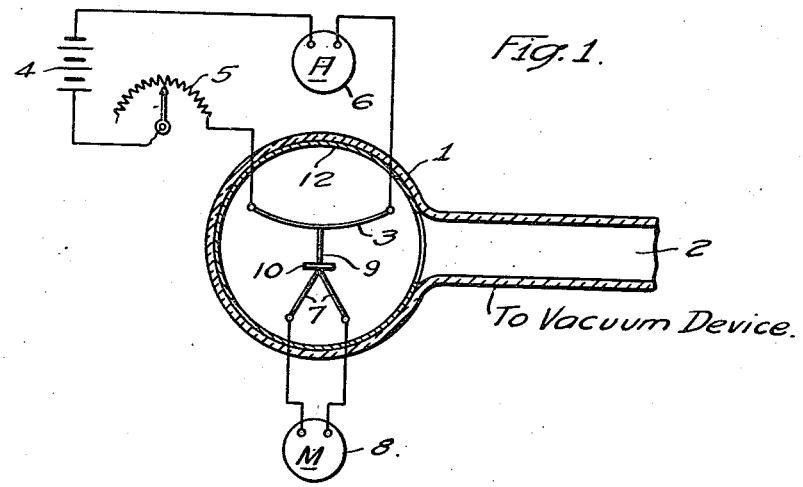
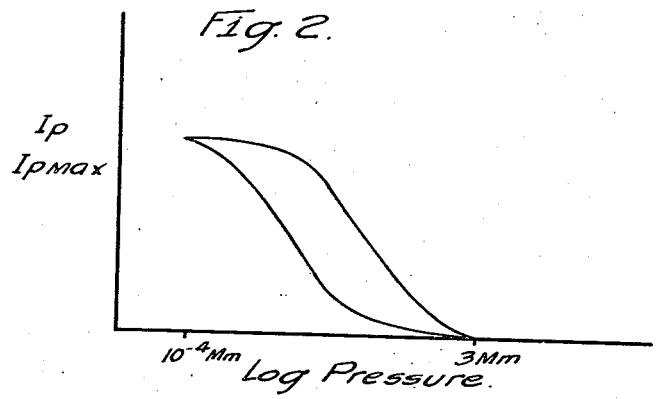
INVENTORS
Gereld L. Tawney and
William A. Johnson.
BY
S. A. Stricklett
ATTORNEY Patented Apr. 6, 1943

2,315,672

UNITED STATES PATENT OFFICE 2,315,672

PRESSURE GAUGE

Gereld L. Tawney and William A. Johnson, Pittsburgh, Pa., assignors to Westinghouse Electric & Manufacturing Company, East Pittsburgh, Pa., a corporation of Pennsylvania Application December 4, 1940, Serial No. 368,492

4 Claims. (Cl. 73—31)

Our invention relates to a pressure gauge and particularly to a gauge of the thermoelectric type for measuring relatively low pressures.

In the measuring of low pressures, such as encountered in vacuum or vapor apparatus, it has heretofore been proposed to utilize thermoelectric generators such as thermocouples associated with an electrically heated element to determine the pressures in the devices. These pressure measuring devices have heretofore been unsatisfactory in that they lack sufficient sensitivity to register small changes of pressure or to satisfactorily indicate different relatively low pressures.

In the device according to our invention, the thermoelectric generator is spaced from the heated element by means of a temperature dropping wire which multiplies the variation in temperature caused by the variation in pressure, so that the thermocouple element is exposed to a wide range of temperature with a relatively narrow range of pressure variation and consequently indicates extremely small variations in pressure therefor having a sensitivity heretofore unexpected in thermoelectric pressure devices.

It is, therefore, an object of our invention to provide a thermoelectric pressure indicating system having a high sensitivity.

It is a further object of our invention to provide a pressure indicator having a thermocouple spaced upon the heating element in the pressure responsive system.

Other objects and advantages of our invention will be apparent from the following detailed description, taken in conjunction with the accompanying drawing, in which:

Figure 1 is a schematic illustration of a pressure measuring instrument according to our invention; and Fig. 2 is a diagrammatic illustration of operation secured by various temperature ranges in the vacuum gauge according to our invention.

The illustrated embodiment of our invention comprises a suitable chamber 1, preferably constructed of glass, although it may be constructed of metal or any other vacuum-tight material. The chamber 1 is provided with an opening 2 for connection to the pressure to be measured, such as a vapor-electric device, or any low-pressure container.

A suitable heating element 3 is placed inside the chamber 1, and is supplied with current from a suitable source, such as a battery 4. Any suitable means, such as a variable resistor 5, is provided in series with the heating element 3 to allow any predetermined current to flow through the heating element 3, the amount of current being indicated by any suitable means, such as the ammeter 6, in series with the heating element 3.

In order to increase the sensitivity of the heating element 3, we prefer to construct the heating element 3 of a form having a large ratio of surface area to the cross-section area of the heating element. We have found that if the heating element 3 is in the form of a relatively thin ribbon, a sufficiently high ratio will be secured.

While any suitable heating element 3 may be utilized, we have found that best results are obtained by using a heating element 3 having a small change in electrical resistance with change of temperature. We have found that the alloys sold under the trade-name of "Nichrome" or "Constantan" are very suitable for this purpose. However, it will be apparent that any heating element can be utilized if suitable means are used to maintain the current substantially constant through the heating element 3.

A suitable thermal electric generator, such as a thermocouple 7, is placed in the chamber 1, preferably in spaced relation to the heating element 3, so that the temperature in the thermocouple 7 is determined by the amount of gas within the space between the heating element 3 and the thermocouple 7. The thermoelectric generator 7 should be of the type having a high thermoelectric electromotive force. This electromotive force is impressed on a suitable voltage responsive device, such as a millivolt meter 8, which then is calibrated in pressure according to the potential delivered by the generator 7.

In order to conduct the heat from the heating element 3 to the thermoelectric generator 7, we have provided a metallic rod or temperature dropping wire 9 which is connected in good thermal contact with the heating element 3 and which extends to the thermal electric generator 7. This heat dropping wire 9 is preferably constructed of a material having a relatively low thermal conductivity. We have found that this temperature dropping wire 9 may be constructed of "Nichrome," "Constantan" or any other material having a relatively low coefficient of thermal conductivity.

In order to secure direct application of the temperature dropping wire 9 to the thermoelectric generator 7, we have provided an interceptor 10 connected in good thermal conductivity to both the wire 9 and the thermoelectric generator 7. The interceptor 10 should be composed of material having high thermal conductivity and low thermal emissivity. We have found that gold, silver or other metals which have a low resistivity and which are not easily oxidized are best suited for thes interceptor device. Preferably, the interceptor 10 is made in the form of a relatively thin element with a large surface area, such as a disk of gold foil.

The interceptor element 10 having a low emissivity loses very little heat by radiation, but, on the other hand, offers a large surface for intercepting the gas molecules in the chamber 1, and thus gives off heat energy proportional to the amount of gas present and further increases the sensitivity of the device.

In general, it is desirable to keep the emissivity of the elements as low as possible, so that the temperature is mainly responsive to the number of gas molecules striking the elements. It is, therefore, desirable to plate the elements with a low emissive metal, such as gold.

In the operation of the gauge according to our invention, the chamber 1 is connected to the pressure to be measured and the gas molecules within the chamber 1 carry away heat from the heating element 3, thereby determining the temperature at which this element operates. Obviously, when a high state of vacuum is maintained, there will be few molecules to carry away the heat from the heating element 3, and the temperature will be accordingly at its maximum. This temperature will be communicated to the temperature dropping wire 9 which will, in turn, be affected by the molecules which carry away heat from the surface of the wire. However, if there is relatively few molecules to carry away this heat, the temperature of the end of the temperature dropping wire 9 remote from the heating element 3 will be substantially the temperature of the heating element. This temperature will be communicated to the interceptor 10, and by the interceptor 10 to the thermoelectric generator 7 which, therefore, produces its maximum potential which is impressed on the millivolt meter 8 to indicate a high vacuum in the device. However, as the pressure increases, there will be an increase of molecules carrying away the temperature from the heating element 3 which, therefore, reduces its temperature and communicates less heat to the temperature dropping wire 9. The molecules contacting the temperature dropping wire 9 carry away a larger quantity of heat, so that the temperature of the end of the temperature dropping wire 9 remote from the heating element 3 will be considerably reduced below the temperature of the heating elment 3 itself. The resulting low temperature is imparted by the interceptor 10 to the thermoelectric generator 7 which produces a relatively lower thermoelectric electromotive force, and consequently causes a lower deflection of the indicating instrument 8, indicating the higher pressure within the container 1.

Because of the wide variation in temperature applied to the thermoelectric generator 7, the instrument has a high sensitivity over a relatively low range of pressure. However, the instrument may be utilized over a large pressure range by applying to the heating element 3 a plurality of heating currents, while the indicating instrument 8 connected to the thermoelectric generator 7 may be provided with a plurality of scales corresponding to the various currents which may be impressed on the heating elements.

In Fig. 2, we have graphically illustrated the pressure difference curves of the thermal electric generator for two different heating currents.

Because of the high sensitivity of the pressure gauge according to our invention, we have found that outside conditions materially affect the operation of the gauge. This may be corrected by applying to the inner surface of the gauge a suitable thermal reflecting surface 12, such as a platinized surface, or by providing a suitable polished metal surface inside the gauge.

While for purposes of illustration we have shown and described a specific embodiment of our invention, it will be apparent that changes and modifications can be made therein without departing from the true spirit of our invention or the scope of the appended claims.

We claim as our invention:

1. A pressure measuring device comprising a glass walled chamber, means for connecting said chamber to the pressure to be measured, a platinized layer substantially covering the inner surface of said chamber, a resistance heating element in said chamber, means for applying a predetermined current to said heating element, a thermocouple in said chamber in spaced relation to said heating element, a metallic member in good thermal contact with said heating element, a gold interceptor interposed in good thermal contact between said metallic member and said thermocouple.

2. A pressure indicating device comprising a chamber, means for connecting said chamber to the pressure to be indicated, a thermal reflecting coating on the inner surface of said chamber, a resistance heating element in said chamber, means for supplying substantially constant current to said heating element, a thermocouple in said chamber, a metallic member having a relatively low coefficient of thermal conductivity extending between the heating element and the thermocouple, an interceptor interposed in good thermal contact between said metallic member and said thermocouple, said interceptor being composed of a metal having high thermal conductivity and low thermal emissivity.

3. A pressure indicating system comprising a chamber connected to the pressure to be measured, a heating element having a large ratio of surface area to cross-section area, a thermoelectric generator spaced from said heating element, a temperature dropping bar secured in good thermal contact with said heating element and extending to said thermoelectric generator, an interceptor composed of a metal having high thermal conductivity and low thermal emissivity in good thermal contact between said temperature dropping bar and said thermoelectric generator.

4. A pressure measuring device comprising a chamber connected to the pressure to be measured, a heated element in said chamber, a thermoelectric element spaced from said heated element, a thermal conductor interposed between said heated element and said thermoelectric element, a disk of gold foil connected in good thermal contact to the end of said thermal conductor and said thermoelectric element, and a surface of gold on said thermal conductor and said heated element.

GERELD L. TAWNEY.
WILLIAM A. JOHNSON.